United States Patent [19]

Trautman

[11] 4,378,945
[45] Apr. 5, 1983

[54] BELLOWS-TYPE SPRING SEAL

[75] Inventor: Gregory J. Trautman, Seattle, Wash.

[73] Assignee: PACCAR Inc., Bellevue, Wash.

[21] Appl. No.: 229,731

[22] Filed: Jan. 29, 1981

[51] Int. Cl.³ .............................................. F16L 37/10
[52] U.S. Cl. .................................. 277/200; 180/54 A; 180/89.14; 180/309; 285/24; 285/187
[58] Field of Search ............... 285/283, 226, 9 R, 268, 285/187, 24; 180/309, 54 A, 89.14; 277/200

[56] References Cited

U.S. PATENT DOCUMENTS

| | | | |
|---|---|---|---|
| 2,922,663 | 1/1960 | Wolf | 285/9 R |
| 2,925,874 | 2/1960 | Norrie | 180/89.14 |
| 3,151,695 | 10/1964 | Mintz | 180/54 A |
| 3,173,710 | 3/1965 | Kinnison | 180/309 |
| 3,319,979 | 5/1967 | Herold et al. | 185/24 |
| 3,482,302 | 12/1969 | Williams | 277/200 |
| 3,490,792 | 1/1970 | Piegza | 285/24 |
| 3,815,941 | 6/1974 | Snyder | 285/283 |
| 4,072,329 | 2/1978 | Mutchler | 285/187 |

Primary Examiner—Robert I. Smith
Attorney, Agent, or Firm—Seed, Berry, Vernon & Baynham

[57] ABSTRACT

A bellows-type spring seal has a flexible bellows with an upper sealing end adapted to mate with a bell housing of an air intake pipe. The seal provides an effective breakaway joint when the cab is tilted forward from over the engine. A means, such as coil springs, encircles the bellows to push upon the underside of the sealing end of the bellows to provide a positive preload sealing force. The seal is self-aligning in the vertical and horizontal planes to accommodate cab rocking and minor misalignment in manufacture of the truck.

12 Claims, 8 Drawing Figures

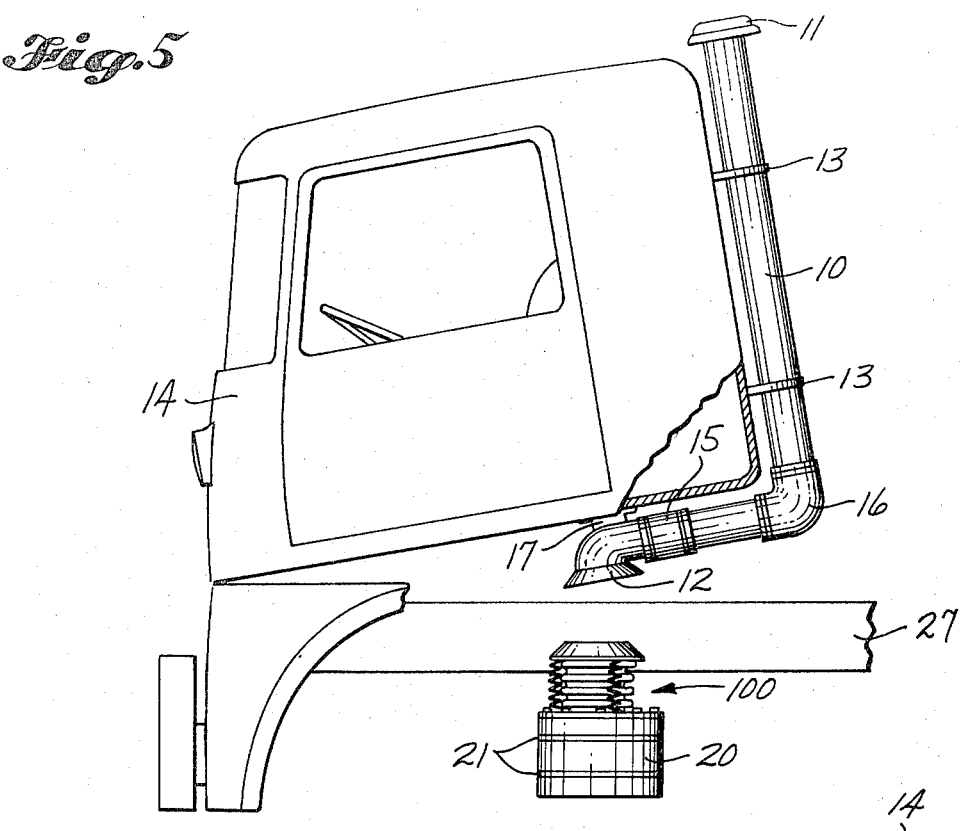
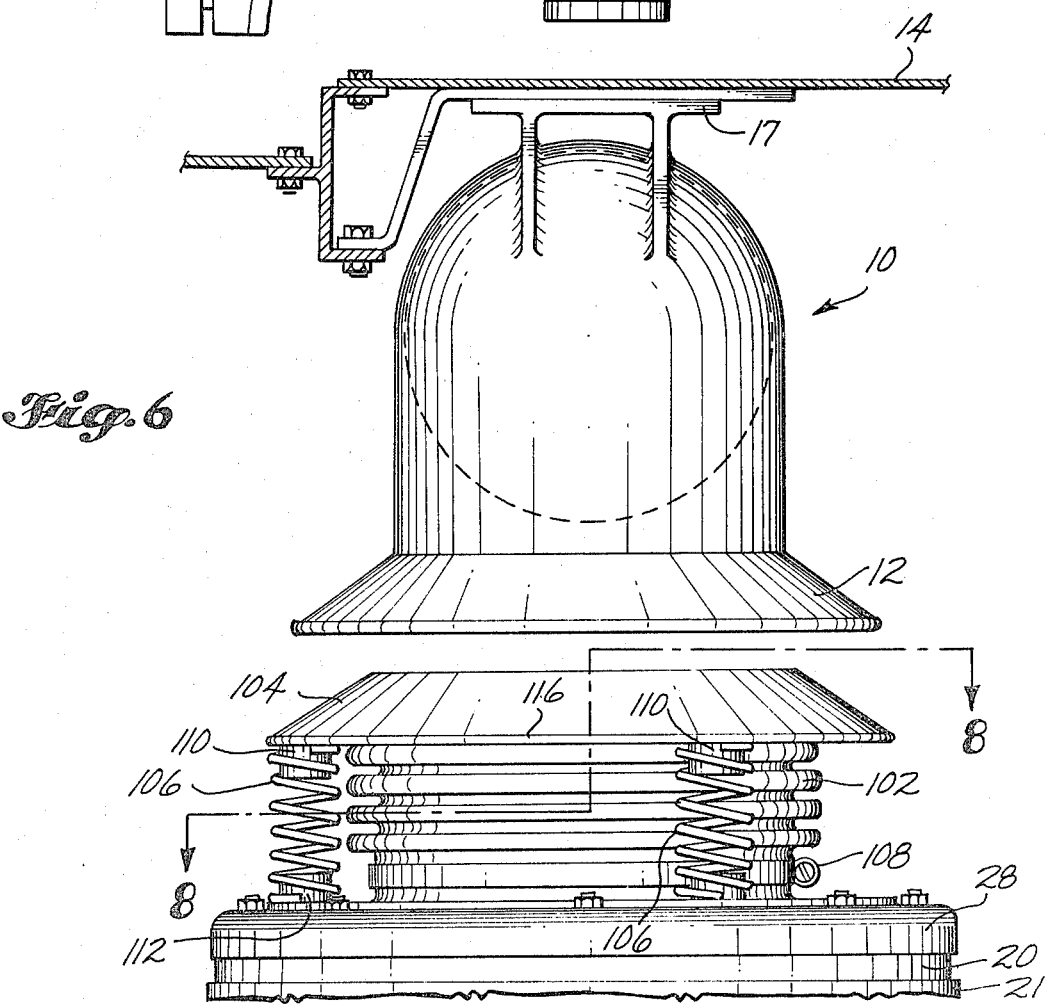

BELLOWS-TYPE SPRING SEAL

DESCRIPTION

1. Technical Field

This invention relates to a novel means for coupling, sealing, and aligning a cab mounted air intake pipe to a frame mounted air cleaner canister while providing an economical and effective breakaway joint. More particularly, the invention relates to a bellows type spring seal to connect the air cleaner canister to an air intake pipe mounted on a cab-over-engine truck.

2. Background Art

As illustrated in FIGS. 1 and 2, a commonly employed means to connect an air intake pipe 10 mounted on the cab 14 of a cab-over-engine truck to an air cleaner canister 20 mounted to the frame is to seat a bell housing 12 on the pipe 10 with a flared sealing end 25 of an extender pipe mounted above the canister 20. To position the flared sealing end 25, a rubber elbow 24 and metal elbow 23 project rearwardly, while the air intake pipe 10 is a straight section of pipe mounted with brackets 13 to the rear of the cab 14. A leaf spring support bracket 22 attach the elbows 23 and 24 to the frame 27, but take up space on the frame which could be better used for mounting fuel tanks, battery boxes, and other necessary equipment. The bracket 22 and elbows 23 and 24 also represent excessive weight. Changing the air cleaner is complicated because the bracket and elbows 23 and 24 must be removed to lift the cover from the canister 20. Finally, the bracket 22 does not allow self-alignment for the seal in the plane perpendicular to the air intake pipe 10. When assembled on the production line, a final adjustment must be made once the cab 14 is placed on the frame 27. While in use, the sealing end 25 and bell housing 12 can become misaligned.

U.S. Pat. No. 2,925,874 (Norrie) discloses an exhaust stack for tilting cab vehicles which uses a system similar to that just discussed for the pripr art air intake. Yet another exhaust system is disclosed in U.S. Pat. No. 3,173,710 (Kinnison); however, the sealing means used therein is much more complex than it need be. The metal-to-metal seals required for the heated exhaust gases increase the complexity if minor vertical misalignment or rocking motion is to be accommodated. Kinnison requires extensive modifications to otherwise commonly available pipes to make his metal-to-metal seals. Machining to high tolerance is also required.

U.S. Pat. No. 3,151,695 (Mintz) discloses an air cleaner seal for tilt cab vehicles whereby an elastomeric bellows seals around the top of an air cleaner canister with magnets. With weight becoming an ever increasing concern in vehicles, canister tops may soon be made of nonmagnetic material, such as plastic. To use magnetic connection requires that the diameter of the bellows are considerably larger than the top of the canister. Once the magnets hit the metal top, they stick. Therefore, to have adequate self-aligning capacity, the bellows is wide. Furthermore, to attach the bellows, the air intake pipe must be modified. Because the seal comes primarily from the flex in the bellows, the seal is likely to fail within a relatively short time as the elasticity of the bellows deteriorates. Finally, the wide bellows creates an orifice which restricts flow and which produces an undesirably large pressure drop. The pressure drop may impair engine performance.

Various other connectors are known, although they appear to be less relevant to this invention due to their environment of use and complexity. These patents include:

U.S. Pat. No., 3,490,792
U.S. Pat. No., 3,815,941
U.S. Pat. No., 4,072,329
U.S. Pat. No., 2,922,663
U.S. Pat. No., 3,319,979

DISCLOSURE OF INVENTION

A novel bellows-type spring seal of this invention provides an effective breakaway joint and significantly improves the air cleaner canister and air intake pipe system in a number of ways. First, the cumbersome and heavy leaf spring and bracket commonly employed to support the air intake pipe are eliminated. A more positive seal is attained with elastomeric sealing surfaces and positive sealing pressure. The flexible bellows provides better self-aligning capability both vertically and horizontally. Replacement of the air filter is greatly eased because the obstruction of the bracketry is removed. Airflow is relatively unrestricted because the bellows forms an extension of the air intake tubing.

The bellows-type spring seal of this invention includes a bellows which has an upper sealing end. The bellows connects between an air intake pipe mounted on the cab and an air cleaner canister mounted on the frame. The lower end of the bellows is fastened with suitable means to the neck of the canister top. To maintain a positive preload on the seal, a means is provided for biasing the sealing end of the bellows away from the canister. Preferably, the biasing is obtained by equidistantly spaced coil springs between the canister top and the underside of the sealing end of the bellows.

BRIEF DESCRIPTION OF THE DRAWINGS

FIG. 5 is a side elevation showing how the bellows-type spring seal of this invention breaks away.

FIG. 6 is a detail of the bellows-type spring seal of this invention.

BEST MODE OF CARRYING OUT THE INVENTION

Figure 1:
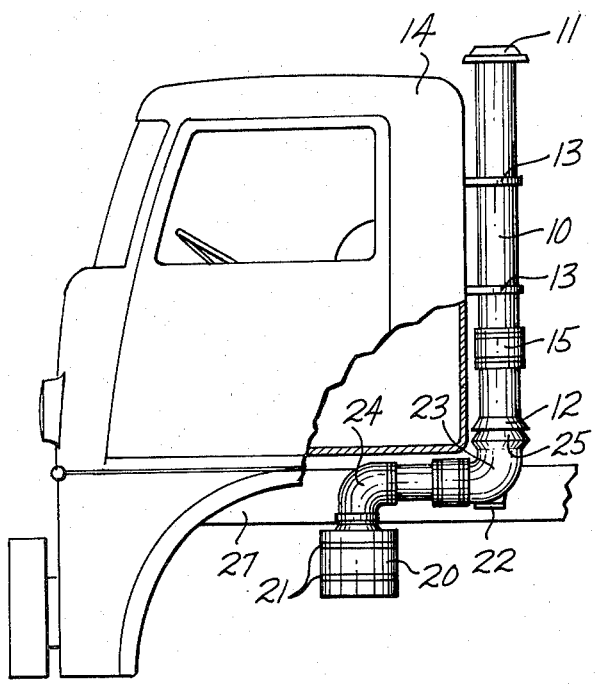
FIG. 1 is a side elevation of a prior art technique for connecting an air intake pipe to an air cleaner canister.
Figure 2:
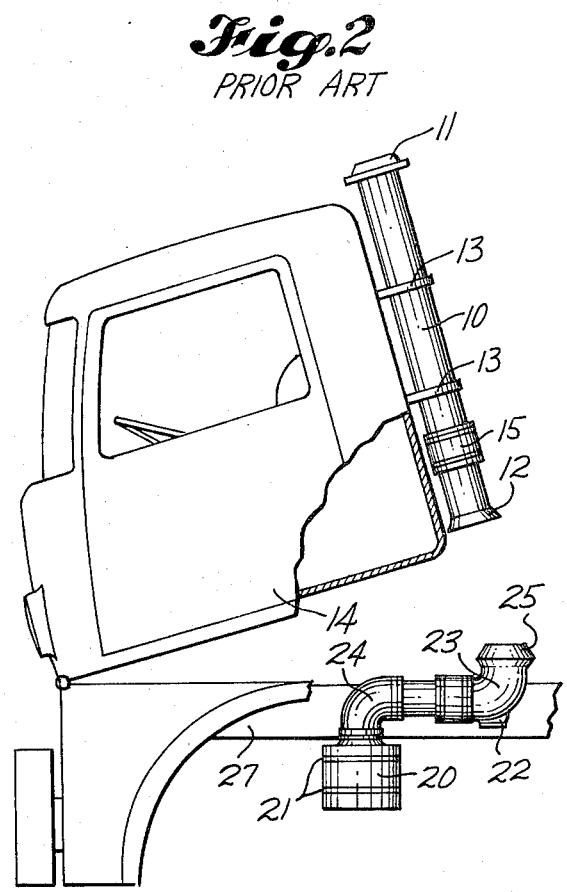
FIG. 2 is another side elevation of the prior art with the cab raised to show how the joint breaks away.
Figure 3:
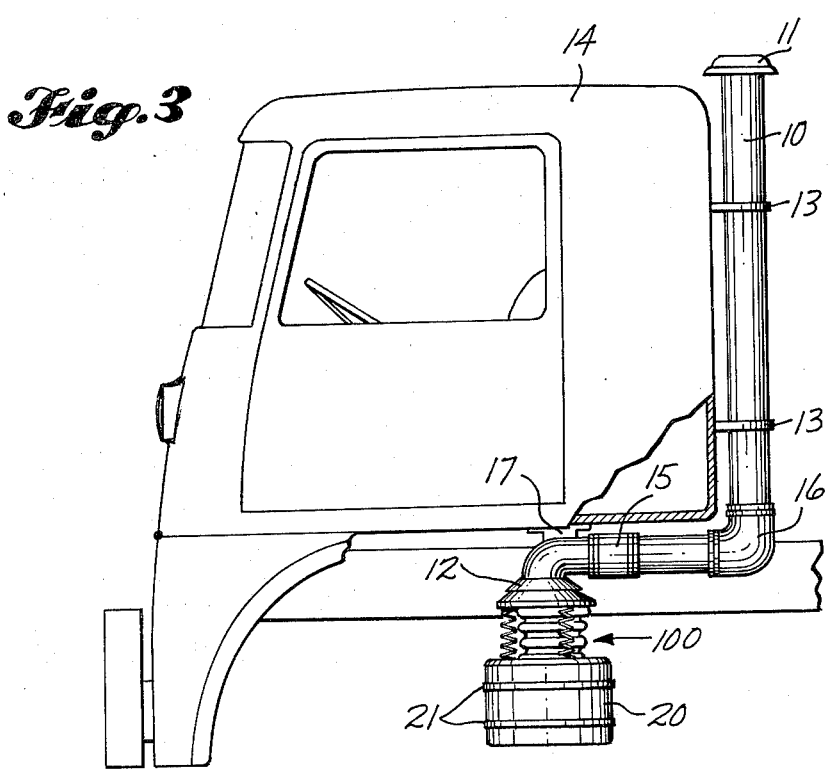
FIG. 3 is a side elevation showing the bellows-type spring seal of this invention.
Figure 4:
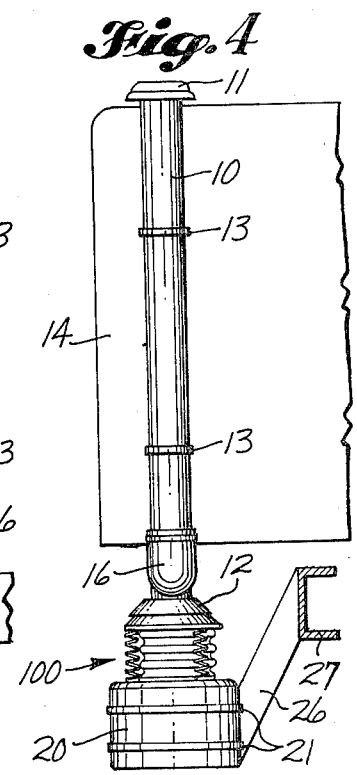
FIG. 4 shows the bellows-type spring seal from the rear of the cab looking forward.

In a cab-over-engine diesel truck (FIGS. 3, 4 and 5) an air intake pipe 10 is mounted with brackets 13 to the rear of the cab 14. The pipe 10 extends upwardly so that fresh air is drawn to the engine. A rain cap 11 keeps precipitation and other material out. The intake pipe 10 sealingly connects with the air cleaner canister 20. The canister is mounted to the frame 27 with mounting bands 21 and a mounting bracket 26 (FIG. 4). A series of elbows 16 and couplings 15, some being elastomeric and flexible, form the necessary tubing to match the canister 20 and intake pipe 10. These pieces are attached to the cab through a mounting bracket 17.

Figure 7:
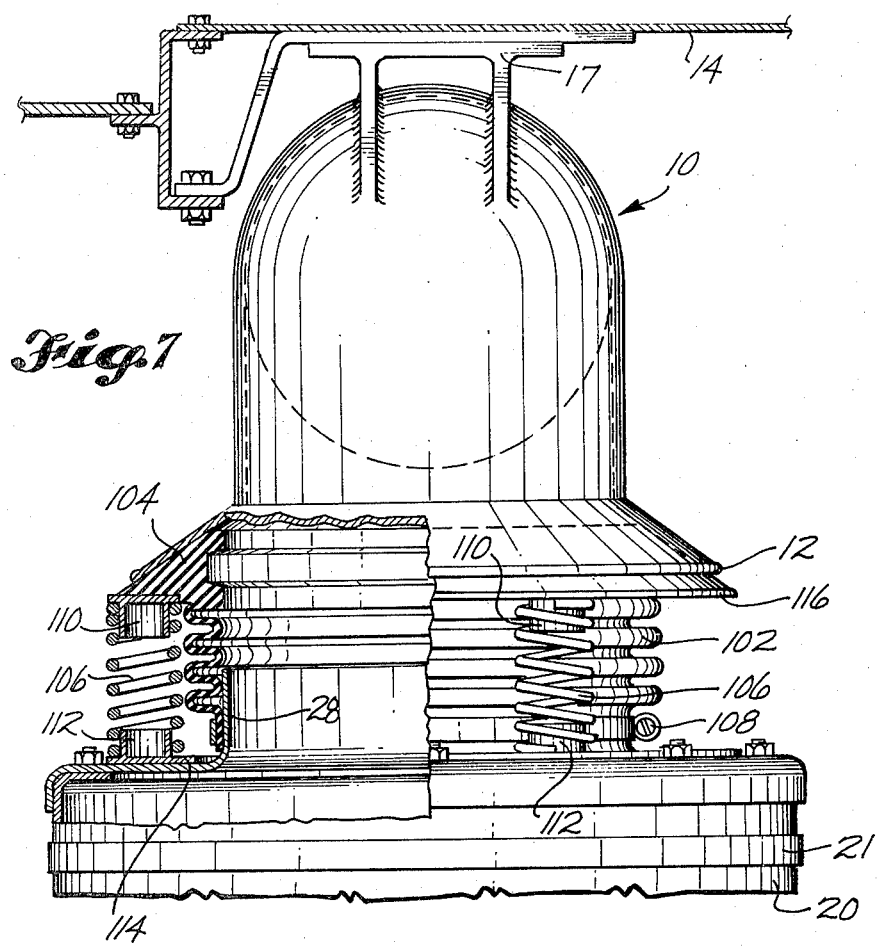
FIG. 7 is a view similar to FIG. 6, partially in section.
Figure 8:
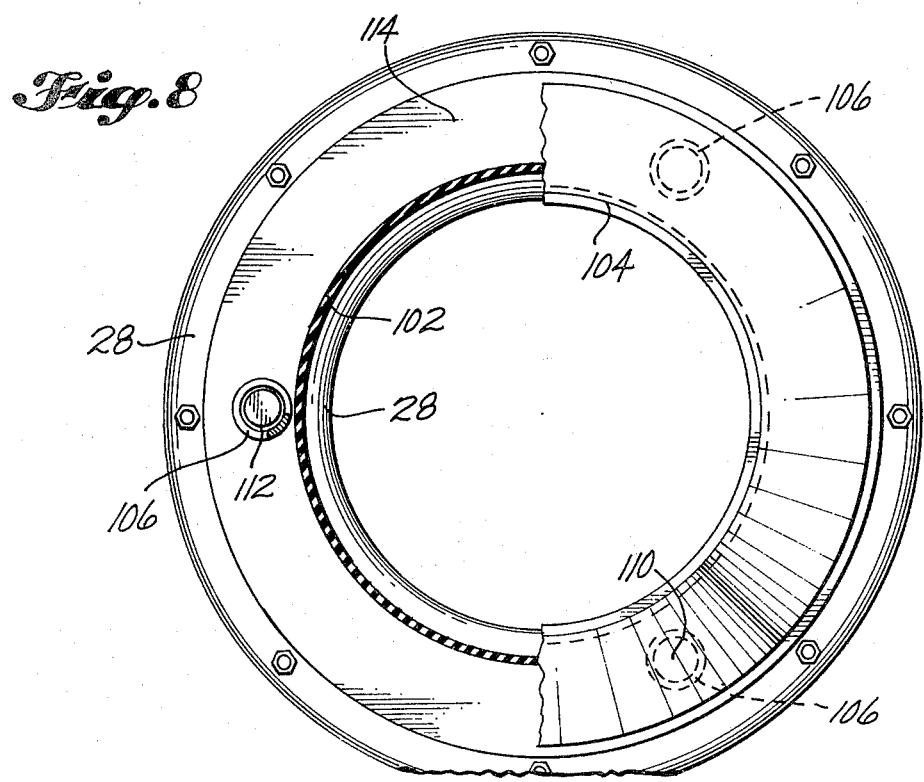
FIG. 8 is another detail, partially in section, taken along line 8—8 of FIG. 6.

The sealing connection is accomplished with a bellows-type spring seal 100 which forms the basis of this invention. As best seen in FIGS. 6, 7 and 8, the preferred bellows-type spring seal comprises a bellows 102 which has an upper sealing end 104 that is sized to mate with the standard bell housing 12 of the air intake pipe 10. The bellows 102 is elastomeric, being made of rubber, synthetic rubber, plastic, rubber-impregnated cloth, plastic-impregnated cloth or another suitable material. Its sealing end 104 usually will be deformable so that when it is pressed against the bell housing 12 of the intake pipe 10, a fluid seal is formed. The bellows 102 provides self-aligning capability for the intake pipe 10 and canister 20. It is able to adjust vertically because it is compressible in the axial direction. It is elastomeric in that it functions as a spring in the axial direction. Thus it may absorb the rocking motion which often develops with a cab-over-engine cab 14. Its flexibility and end shape allow for self-aligning for minor offsets in the horizontal plane.

The lower end of the bellows 102 is attached to the canister top 28 about its neck with suitable means 108, such as a hose clamp. The bellows 102 is an extension of the air intake tubing and does not create a substantial restriction to airflow.

A novel feature of this invention is a means (supplemental to the bellows' elasticity) for biasing the upper sealing end 104 of the bellows 102 away from the canister top 28. Preferably, three coil springs 106 are equidistantly spaced about the periphery of the bellows. Each spring 106 rests on a pin 112 which protrudes upwardly from a ring 114 resting on the canister top 28. The upper end of each spring 106 similarly encircles a pin 110 on another ring 116. The pins 110 and 112 function to position the springs 106. Each spring 106 exerts an upward preload force of about 90 pounds on the underside of the sealing end 104 of the bellows 102. This force helps to keep a fluid seal between the sealing end 104 and the bell housing 12 of air intake pipe 10. Other means to provide a uniformly distributed preload force on the sealing end 104, such as a single coil spring encircling the bellows or a plurality of independent coil springs, may be used.

A bellows-type spring seal of this construction reduces many of the problems found in prior art seals. It allows use of standard materials presently available. The seal 100 is easily manufactured. It has no welded parts. Various parts are easily replaced when worn. The seal 100 is simple, yet effective and economical in providing a breakaway joint.

Those skilled in the art will recognize numerous modifications to the bellows-type spring seal which is shown and described. These modifications are considered to be part of this invention. Therefore, the invention should be limited only if such limitation is necessary because of the prior art or the nature and spirit of the appended claims.

What is claimed is:

1. A bellows-type spring seal to connect between a cab-mounted air intake pipe and a frame-mounted air cleaner canister while providing an effective breakaway joint when the cab tilts from over the engine in a cab-over-engine truck, comprising:
   a bellows extending upwardly from the canister top, having an upper, deformable sealing end, and being capable of providing self-alignment between the air intake pipe and the canister;
   means for attaching the lower end of the bellows to the canister; and
   means encircling the bellows for biasing the sealing end of the bellows away from the canister toward the intake pipe and for providing a positive preload for the seal.

2. The seal of claim 1 wherein the bellows is an elastomer.

3. A bellows-type spring seal to connect between a cab-mounted air intake pipe and a frame mounted air cleaner canister while providing an effective breakaway joint when the cab tilts from over the engine in a cab-over-engine truck, comprising:
   a bellows having an upper sealing end and being capable of providing self-alignment between the air intake pipe and the canister;
   means for attaching the lower end of the bellows to the canister; and
   means encircling the bellows for biasing the sealing end of the bellows away from the canister and for providing a positive preload for the seal, including a plurality of coil springs spaced about the periphery of the bellows, and a free-standing ring encircling the bellows and resting on the canister, the ring having posts to position the springs.

4. The seal of claim 3 wherein the sealing end of the bellows is deformable to create a better sealing seat with the air intake pipe.

5. The seal of claim 3 wherein the sealing end of the bellows is flared to mate with the bell housing of a common air intake pipe.

6. A bellows-type spring seal to connect between a cab-mounted air intake pipe and a frame-mounted air cleaner canister while providing an effective breakaway joint when the cab tilts from over the engine in a cab-over-engine truck, comprising:
   an elastomeric bellows having an upper, deformable sealing end and being capable of providing self-alignment between the air intake pipe and the canister;
   a means for clamping the lower end of the bellows to the canister; and
   a plurality of coil springs spaced about the periphery of the bellows for biasing the sealing end of the bellows away from the canister and for providing a positive preload for the seal, positioned upon posts of a ring which encircles the bellows and rests atop the canister.

7. The seal of claim 6 wherein the sealing end of the bellows is flared to mate with the bell housing of a common air intake pipe.

8. The seal of claim 6 wherein there are three coil springs.

9. The seal of claim 8 wherein the springs are equidistantly spaced.

10. An elastic spring-biased seal assembly to connect between a cab-mounted air intake pipe and a frame-mounted air cleaner canister while providing an effective breakaway joint when the cab tilts from over the engine in a cab-over-engine truck, comprising:
   an axially elastic, radially flexible, elastomeric tubular member fixedly secured at a first end to one of said canister and air intake pipe and providing self-alignment between the air intake pipe and the canister and having a movable, deformable, sealing second end opposite said first end for sealing with the mating end of the other of said canister and air intake pipe, wherein the elastic spring-biased seal assembly eliminates the need for brackets to properly align piping between the canister and the air intake pipe; and a plurality of three or more independent spring means encircling the tubular member for biasing the sealing end of the tubular member to axially, elastically stretch the tubular member for providing a positive preload for the seal against the mating end of the other of said canister and air intake pipe.

11. The seal assembly of claim 10 wherein said first end of said tubular member is clamped to said canister and said sealing second end is engageable with said mating end of said air intake pipe.

12. The seal assembly of claim 10 wherein said tubular member includes a corrugated bellows, said sealing second end including an elastomeric, enlarged conical sealing ring integral with said bellows.

* * * * *